| (12) | United States Patent | (10) Patent No.: | US 9,971,232 B2 |
|---|---|---|---|
| | Jeong | (45) Date of Patent: | May 15, 2018 |

(54) BRACKET FOR TERMINAL WITH CAMERA MODULE

(71) Applicant: Mypove Inc., Gyeonggi-do (KR)

(72) Inventor: Jaehyun Jeong, Gyeonggi-do (KR)

(73) Assignee: Mypove Inc., Ansan-si, Gyeonggi-do (KR)

( * ) Notice: Subject to any disclaimer, the term of this patent is extended or adjusted under 35 U.S.C. 154(b) by 143 days.

(21) Appl. No.: 14/863,456

(22) Filed: Sep. 24, 2015

(65) Prior Publication Data

US 2016/0252800 A1  Sep. 1, 2016

(30) Foreign Application Priority Data

Feb. 27, 2015 (KR) .................. 20-2015-0001319 U
Aug. 19, 2015 (KR) ........................ 10-2015-0116532

(51) Int. Cl.

| F16M 13/00 | (2006.01) |
| G03B 17/56 | (2006.01) |
| A45F 5/00 | (2006.01) |
| F16M 13/04 | (2006.01) |
| F16M 11/04 | (2006.01) |
| F16M 11/14 | (2006.01) |
| F16M 11/20 | (2006.01) |
| F16M 11/38 | (2006.01) |
| F16M 13/02 | (2006.01) |

(52) U.S. Cl.
CPC .............. *G03B 17/561* (2013.01); *A45F 5/00* (2013.01); *F16M 11/041* (2013.01); *F16M 11/14* (2013.01); *F16M 11/2021* (2013.01); *F16M 11/38* (2013.01); *F16M 13/00* (2013.01); *F16M 13/022* (2013.01); *F16M 13/04* (2013.01); *G03B 17/563* (2013.01); *G03B 17/566* (2013.01); *A45F 2005/006* (2013.01); *A45F 2200/0516* (2013.01); *A45F 2200/0533* (2013.01)

(58) Field of Classification Search
CPC ...... F16M 13/00; F16M 13/022; F16M 11/38; F16M 11/041; F16M 11/14; F16M 11/2021; A45F 2200/0516; A45F 2200/0533; A45F 2005/006
USPC ......................................................... 224/576
See application file for complete search history.

(56) References Cited

U.S. PATENT DOCUMENTS

| 1,191,425 | A | * | 7/1916 | Huddle | ................. | A47B 23/002 |
| | | | | | | 108/43 |
| 1,691,733 | A | * | 11/1928 | Nordin | .................... | F16M 13/04 |
| | | | | | | 396/423 |
| 2,658,435 | A | * | 11/1953 | Sarvoy | .................... | F16M 13/04 |
| | | | | | | 2/300 |
| 2,952,200 | A | * | 9/1960 | Welch | ..................... | F16M 13/04 |
| | | | | | | 224/623 |
| 3,332,593 | A | * | 7/1967 | Fauser | ................... | F16M 13/04 |
| | | | | | | 224/185 |
| 4,437,753 | A | * | 3/1984 | Dunn | ...................... | F16M 11/14 |
| | | | | | | 248/169 |

(Continued)

*Primary Examiner* — Brian D Nash

(74) *Attorney, Agent, or Firm* — Revolution IP, PLLC

(57) ABSTRACT

Provided is a bracket for a terminal with a camera module, which can photograph situations in which a user uses both hands while moving or acting. The bracket for the terminal with the camera module includes a hanger part having a bent shape so as to be hung around the neck of a user, a mounting part onto which the terminal is mounted, and a connection part connecting the hanger part and the mounting part.

19 Claims, 11 Drawing Sheets

(56) References Cited

U.S. PATENT DOCUMENTS

| | | | | |
|---|---|---|---|---|
| 4,637,535 A * | 1/1987 | Aleman | A45F 5/00 | 224/257 |
| 4,715,293 A * | 12/1987 | Cobbs | A47B 23/002 | 108/43 |
| D388,246 S * | 12/1997 | Patterson | D3/204 | |
| 5,724,225 A * | 3/1998 | Hrusoff | A45F 3/14 | 206/305 |
| 5,725,136 A * | 3/1998 | Shires | F16M 13/04 | 224/257 |
| 5,749,010 A * | 5/1998 | McCumber | F16M 13/04 | 224/265 |
| 5,829,652 A * | 11/1998 | Denzer | A45F 3/14 | 222/259 |
| 6,006,970 A * | 12/1999 | Piatt | A45F 3/14 | 224/257 |
| 6,695,188 B1 * | 2/2004 | Bradshaw | F16M 13/04 | 224/245 |
| 6,796,468 B1 * | 9/2004 | Nideborn | A45F 5/00 | 224/201 |
| D509,627 S * | 9/2005 | Willows | D29/101.2 | |
| 7,671,261 B1 * | 3/2010 | Momose | G10G 5/005 | 84/421 |
| 7,673,776 B2 * | 3/2010 | May | G10D 13/00 | 224/265 |
| 8,657,166 B1 * | 2/2014 | Harness | A45F 5/021 | 224/259 |
| 8,783,973 B2 * | 7/2014 | Pizzo | G03B 17/00 | 248/187.1 |
| 9,038,870 B2 * | 5/2015 | Johnson | A45C 11/00 | 224/181 |
| 9,038,872 B1 * | 5/2015 | Chang | A45F 5/00 | 224/257 |
| 9,182,654 B2 * | 11/2015 | Pizzo | G03B 17/00 | |
| 9,433,279 B1 * | 9/2016 | Kemper | F16M 13/04 | |
| 2008/0173681 A1 * | 7/2008 | Robinson | A45F 3/14 | 224/257 |
| 2010/0025444 A1 * | 2/2010 | Tipton | A45F 5/00 | 224/576 |
| 2011/0089207 A1 * | 4/2011 | Tricoukes | H04M 1/05 | 224/181 |
| 2013/0004153 A1 * | 1/2013 | McKee | F16M 11/041 | 396/420 |
| 2014/0231482 A1 * | 8/2014 | Chamberlayne | A45F 5/00 | 224/623 |
| 2015/0048134 A1 * | 2/2015 | Fawcett | F16M 13/04 | 224/576 |
| 2015/0195392 A1 * | 7/2015 | Nissenbaum | H04M 1/04 | 455/569.1 |

* cited by examiner

[Figure 1]
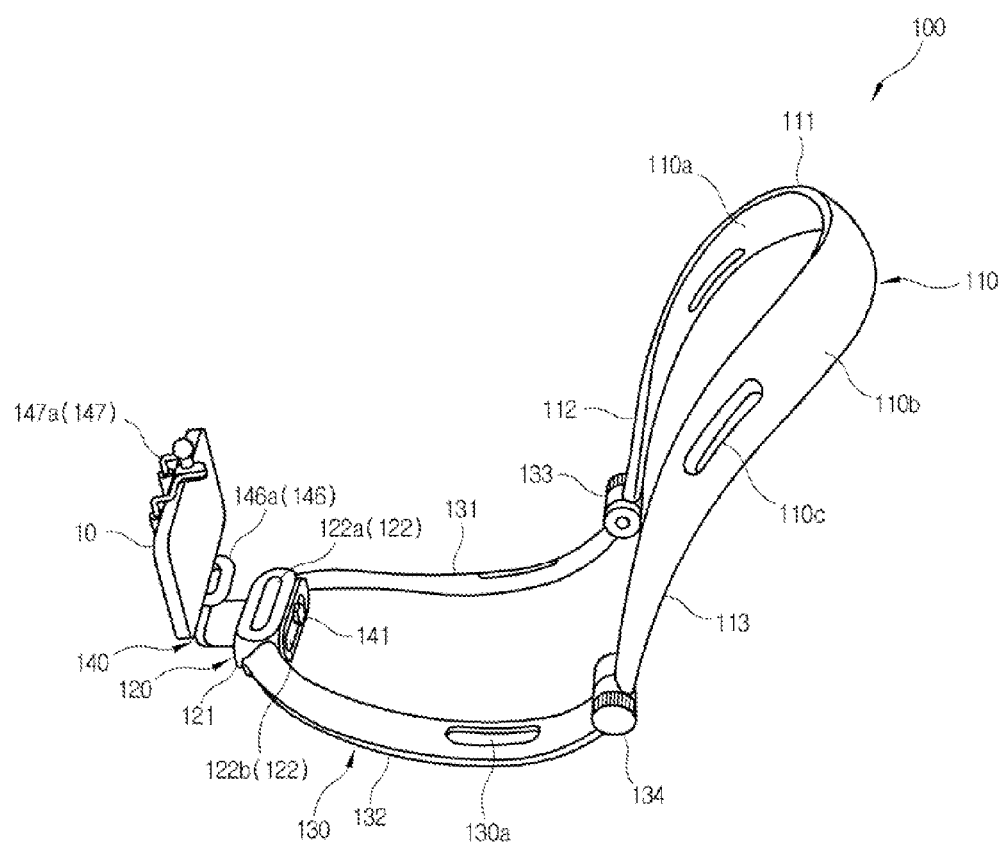

[Figure 2]
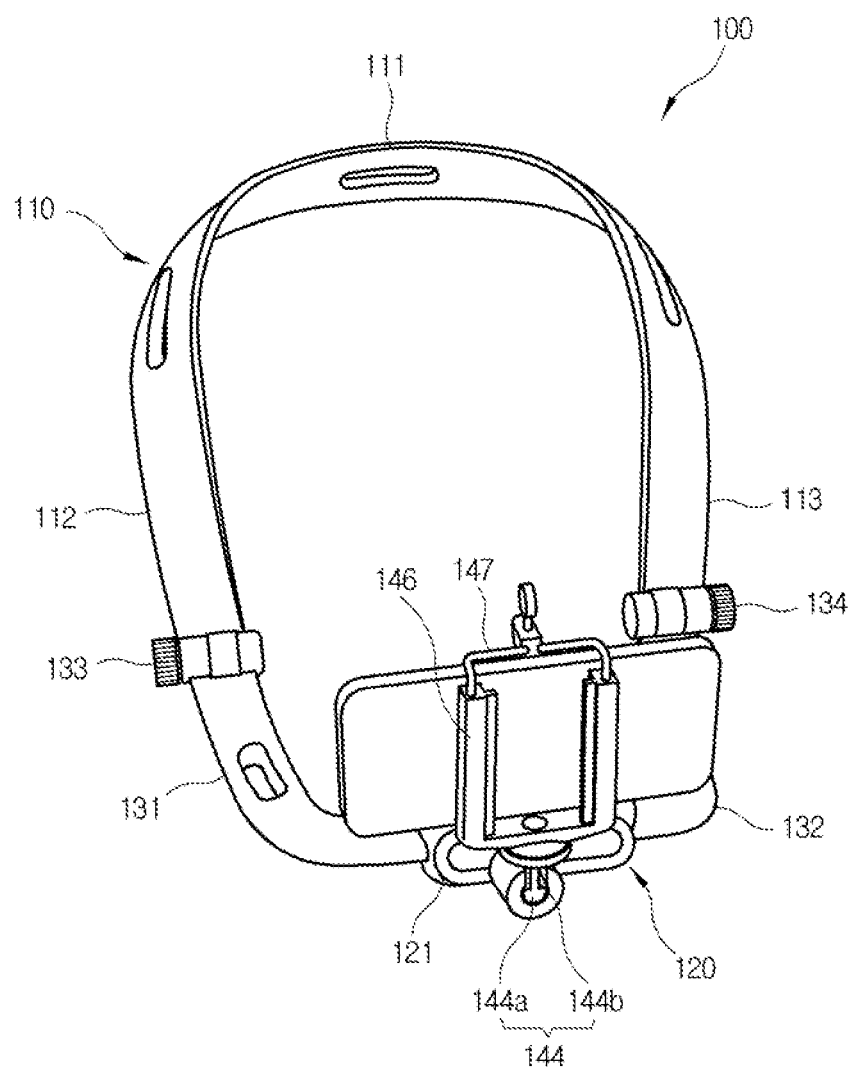

[Figure 3]
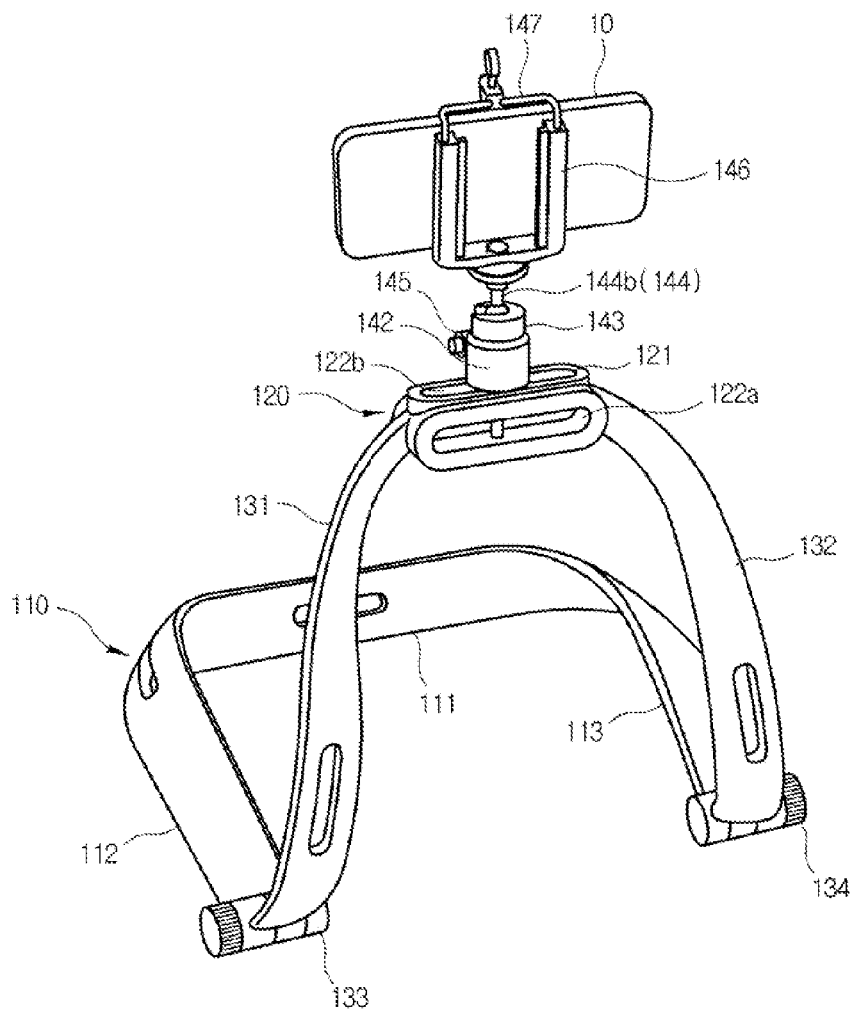

[Figure 4]
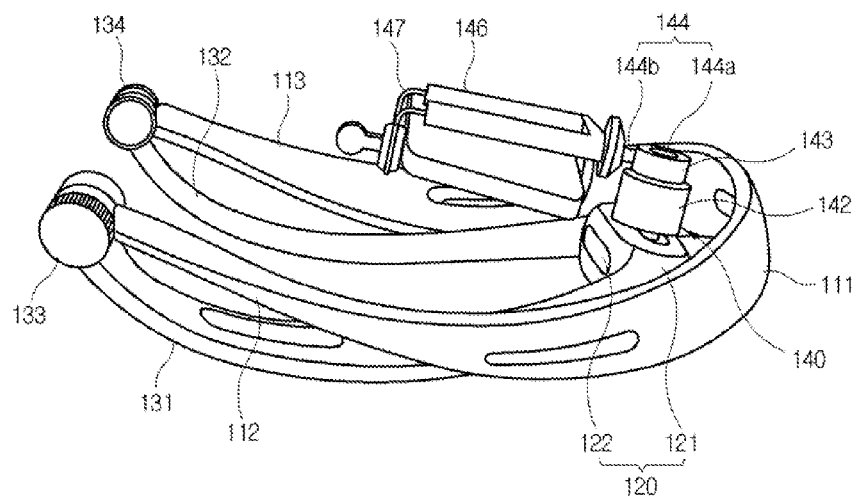
[Figure 5]
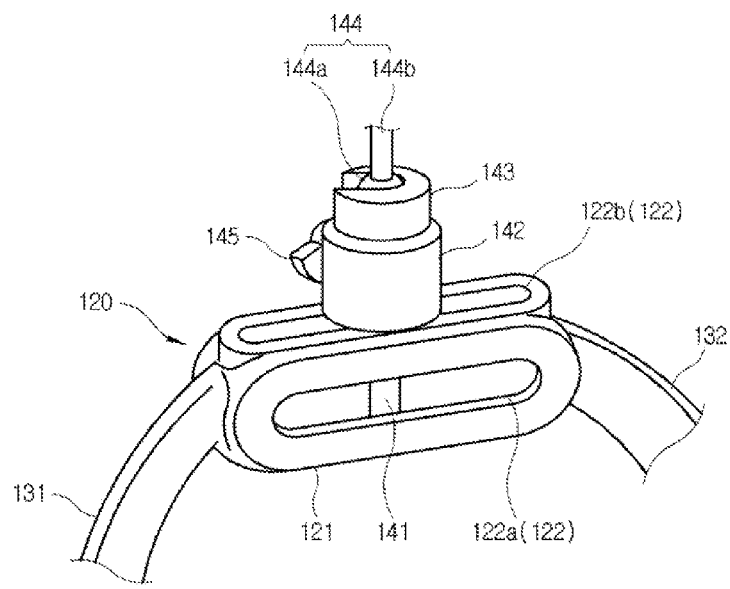

[Figure 6]
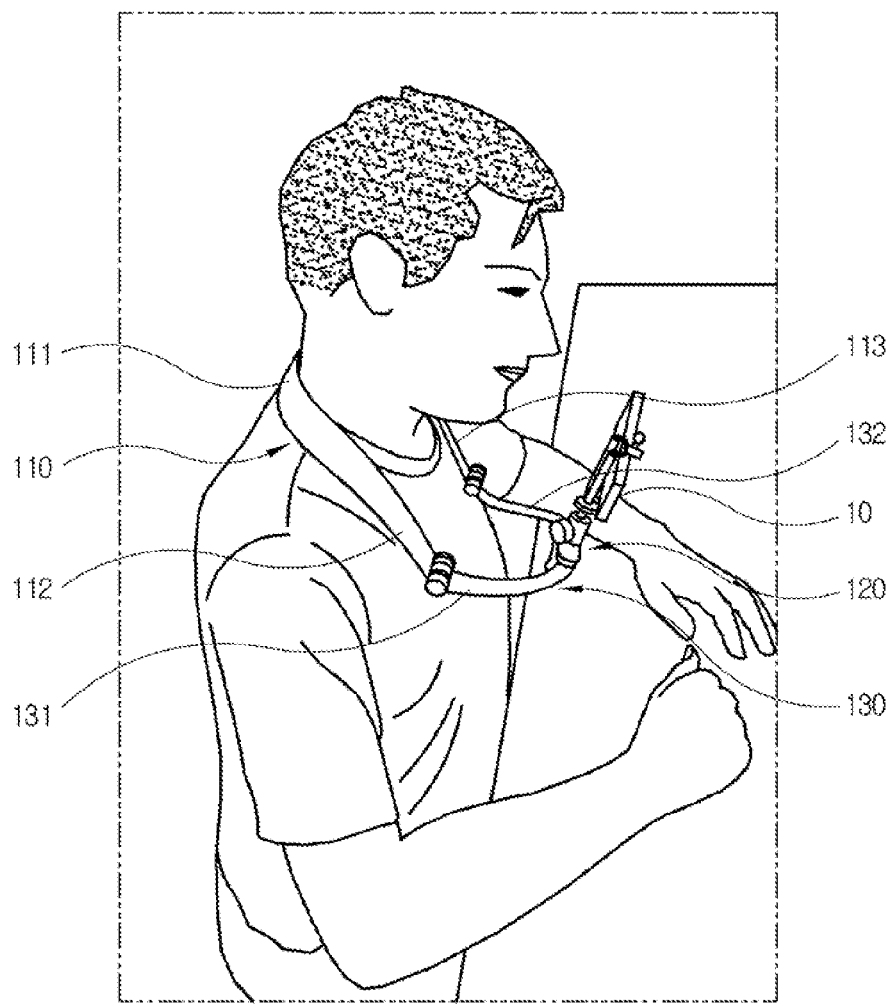

[Figure 7]
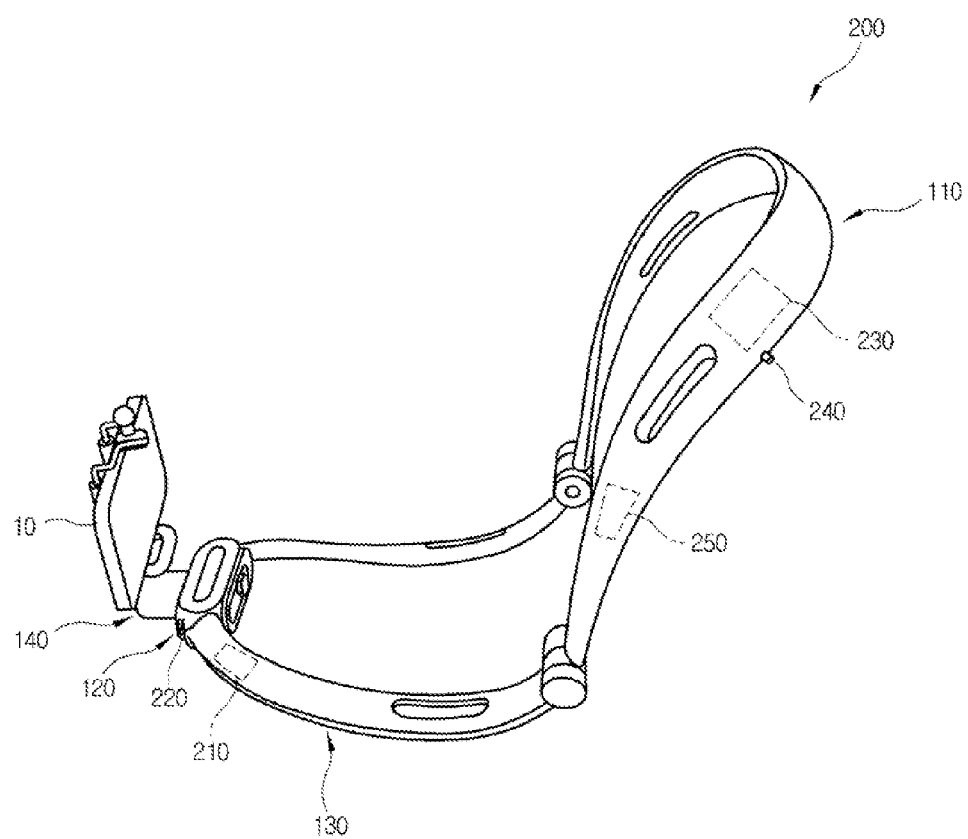

[Figure 8]
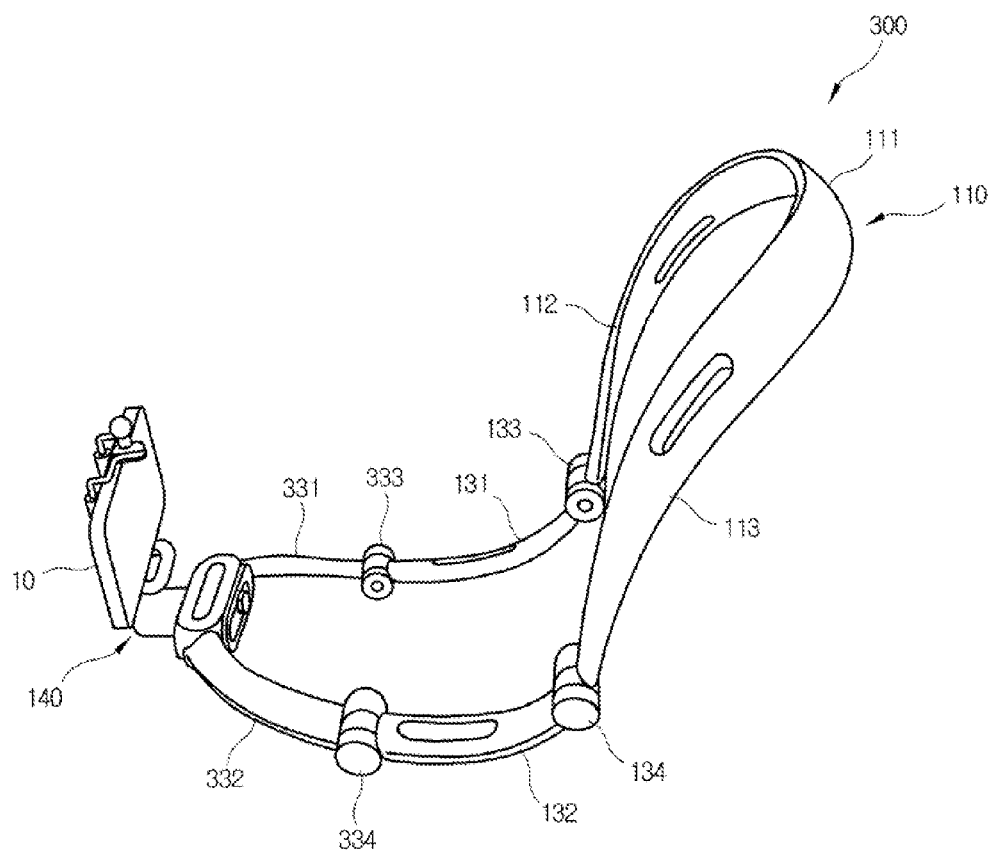

[Figure 9]
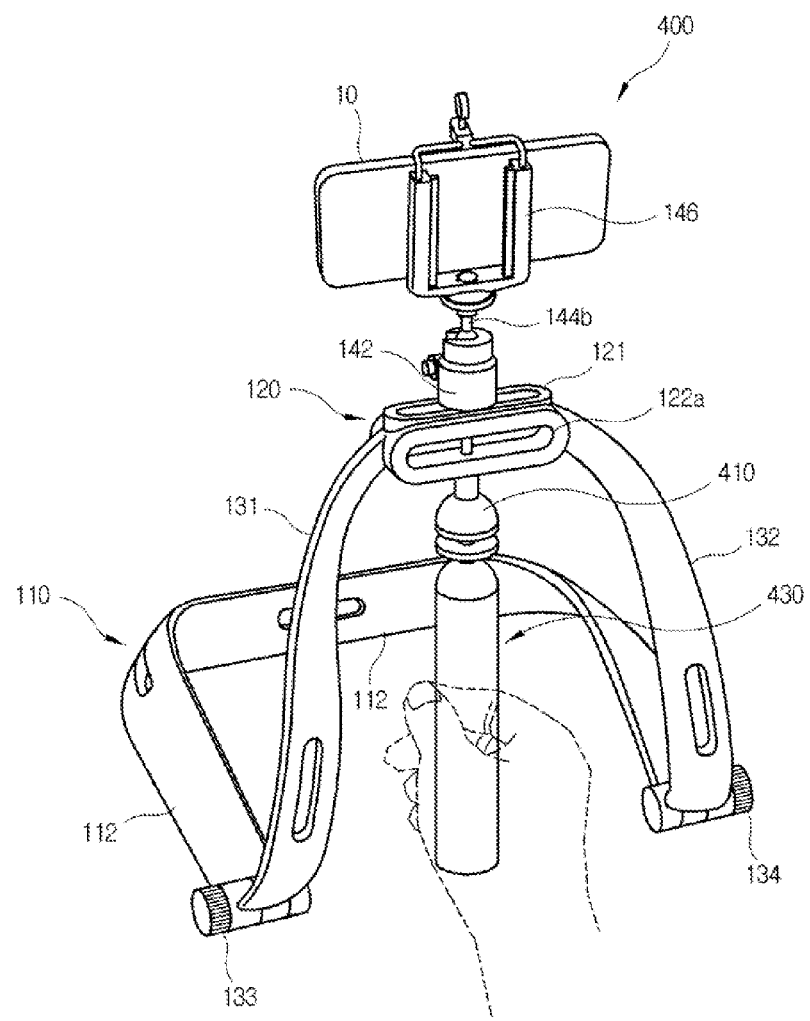

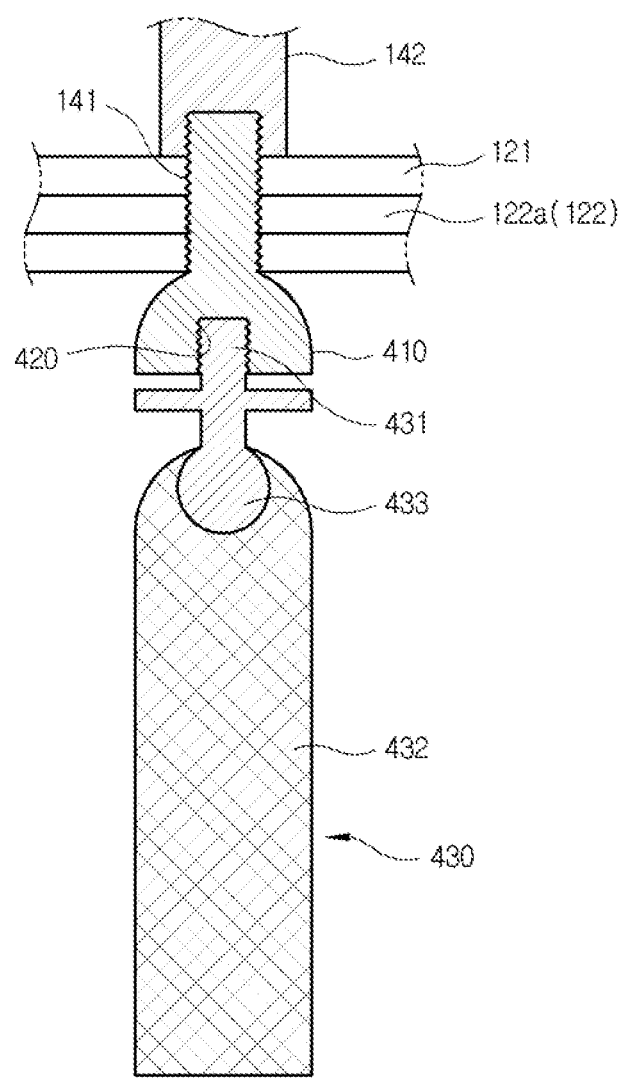
[Figure 10]

【Figure 11】
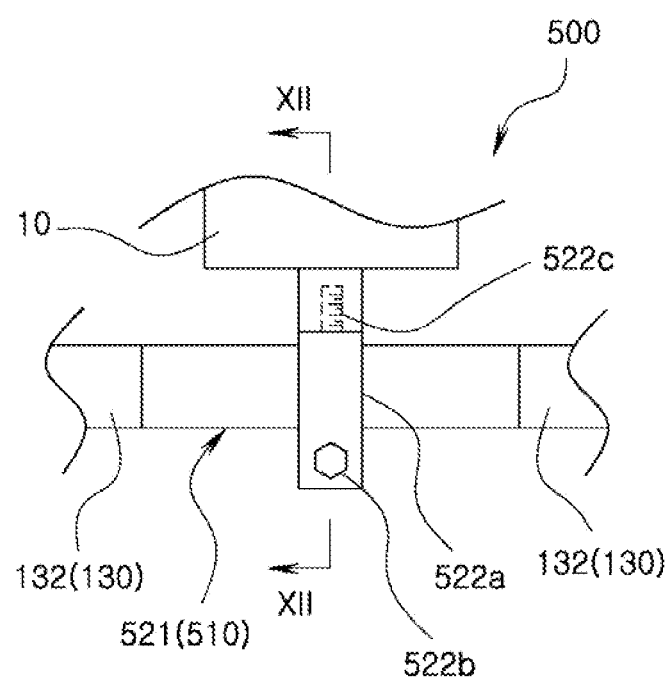

[Figure 12]
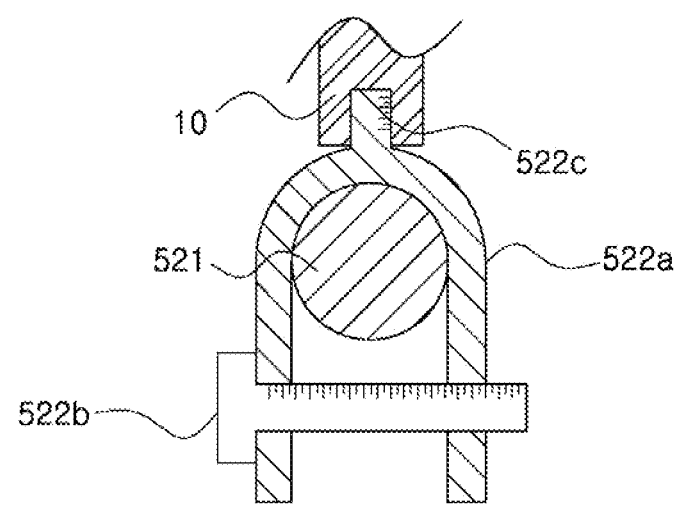

BRACKET FOR TERMINAL WITH CAMERA MODULE

CROSS-REFERENCE TO RELATED APPLICATIONS

This U.S. non-provisional patent application claims priority under 35 U.S.C. § 119 of Korean Utility Model Application No. 20-2015-0001319, filed on Feb. 27, 2015 and Korean Patent Application No. 10-2015-0116532, filed on Aug. 19, 2015, the entire contents of which are hereby incorporated by reference.

BACKGROUND OF THE INVENTION

The present invention disclosed herein relates to a bracket used for a terminal with a camera module.

Generally, terminals with a camera include all kinds of terminals including a camera module that can photograph images. Examples of terminals include smartphones, smartwatches, tablet PCs, black boxes, digital cameras, film cameras, and camcorders.

As existing brackets for terminals with a camera, which are used to hold terminals, a place mounted bracket that is fixedly installed onto one place and a hand type bracket (called "selfie stick") that is used in hand of a user are widely known.

However, since the place mounted bracket is used while being fixed onto one place, it is difficult to photograph a user in motion and action. Also, in case of the hand type bracket, since a user cannot use both hands, there is a limitation in use for activities such as cooking or exercise in which both hands are needed.

SUMMARY OF THE INVENTION

The present invention provides a bracket for a terminal with a camera module, which can photograph situations in which a user uses both hands while moving or acting.

Embodiments of the present invention provide brackets for a terminal with a camera module, comprising: a hanger part having a bent shape so as to be hung around the neck of a user; a mounting part onto which the terminal is mounted; and a connection part connecting the hanger part and the mounting part.

The hanger part may include: a central portion having a curved shape so as to cover a rear portion of the neck of a user; and first and second end portions extending from both ends of the central portion, respectively, and having a curved shape so as to cover the shoulder and the chest of a user.

The first end portion, the central portion, and the second end portion may sequentially extend and may be formed of a plate member having a first surface and a second surface, and when the first surface of the central portion is placed toward the neck of a user, the first end portion may have a twisted shape with respect to the central portion such that the first surface of the first end portion is disposed toward the shoulder and chest at one side of a user, and the second end portion may have a twisted shape with respect to the central portion such that the first surface of the second end portion is disposed toward the shoulder and chest at the other side of a user.

The central portion may be hung on the rear portion of a user, and the first and second end portions may be supported by the shoulder and chest of a user.

The hanger part may have at least one first band hole formed in a longitudinal direction thereof.

The bracket may include a flexible band disposed in the first band hole and making contact with the body of a user.

The connection part may include: a first connector connecting one end of the mounting part and the first end portion; a second connector connecting the other end of the mounting part and the second end portion; a first pivot pivotably connecting the first connector and the first end portion; and a second pivot pivotably connecting the second connector and the second end portion.

The hanger part, the connection part, and the mounting part may be connected to each other, forming a looped curve shape.

The first and second connectors may be formed of a plate member, and may be bent in a width direction thereof such that an interval between the first connector and the second connector is gradually narrowed from the first and second end portions to the mounting part.

The first and second connectors may have at least one second band hole formed in a longitudinal direction thereof.

The mounting part may include: a mounting body disposed at a center of the connection part and having a long shape onto which the terminal is mounted; and at least one location adjustment hole penetrating the mounting body in a longitudinal direction thereof and adjusting the location of the terminal in a longitudinal direction thereof.

The mounting body may have a long hexahedral shape, and the at least one location adjustment hole may include: a first location adjustment hole penetrating the mounting body in a vertical direction; and a second location adjustment hole penetrating the mounting body in forward and backward directions.

The bracket may further include a detachable unit that allows the terminal to be detachably mounted onto the mounting part.

The detachable unit may include: a bolt inserted into the location adjustment hole; and a nut coupled to the bolt, and the terminal may be disposed on the bolt or the nut.

The detachable unit may further include: a spherical holder disposed on the bolt or the nut; a ball connector comprising a ball member disposed in the spherical holder and a fixing screw protruding from one side of the ball member; and a locking screw disposed on the spherical holder and stopping or allowing the movement of the ball member, and the terminal may be screw-coupled to the fixing screw.

The detachable unit may further include: a fixing grip member coupled to the fixing screw, having a guide groove formed therein, and comprising a first stopper; and a moving grip member slidably disposed in the guide groove, elastically coupled or screw-coupled to the fixing grip member by an elastic body, and having a second stopper, and the terminal may be located between the first and second stoppers and may be gripped by a restoring force of the elastic body.

The bracket may further include: a head disposed on the bolt or the nut; a screw coupling hole formed in the head and having a screw thread formed on the inner circumferential surface thereof; and a stabilizer coupled to the screw coupling hole and maintaining the center of gravity of the bracket when a user grips the bracket after balancing the center of gravity of the bracket.

The connection part may further include: a third connector connecting between the first connector and one end of the mounting part; a fourth connector connecting between the second connector and the other end of the mounting part; a third pivot pivotably connecting the first connector and the third connector; and a fourth pivot pivotably connecting the second connector and the fourth connector.

The bracket may further include: a secondary battery having a strip shape and inserted into the connection part or the hanger part; and a charger terminal disposed in the mounting part and electrically connected to the secondary battery.

The bracket may further include: a communication module inserted into the hanger part or the connection part and communicating with an external device; and an earphone terminal disposed in the hanger part or the connection part and electrically connecting the communication and an external earphone The bracket may further include: a communication module inserted into the hanger part or the connection part and communicating with an external device; and a remote control disposed in the hanger part or the connection part and electrically connected to the communication module to control the external device.

The hanger part and the connection part may include a metal plate and a flexible polymer or leather covering the metal plate.

The mounting part may include: a cylindrical bar disposed at the center of the connection part and having a long cylindrical shape; and a connection unit connecting the cylindrical bar and the terminal, and the connection unit may include: a connection bracket having a U-shape to house the cylindrical bar; a both-end fastening bolt penetrating both end portions of the connection bracket and fastening or unfastening the both end portions of the bracket in a face-to-face direction; and a terminal coupling bolt disposed at an outer side of the center of the connection bracket and coupled to the terminal.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a perspective side view illustrating a bracket for a terminal with a camera module according to an embodiment of the present invention;

FIG. 2 is a perspective front view illustrating a bracket for a terminal with a camera module according to an embodiment of the present invention;

FIG. 3 is a perspective view illustrating a bracket for a terminal with a camera module placed on the floor according to an embodiment of the present invention;

FIG. 4 is a perspective view illustrating a folded bracket for a terminal with a camera module according to an embodiment of the present invention;

FIG. 5 is a magnified view of a portion "A" in FIG. 3;

FIG. 6 is a view illustrating a bracket for a terminal with a camera module worn on the body of a user according to an embodiment of the present invention;

FIG. 7 is a view illustrating a bracket for a terminal with a camera module according to another embodiment of the present invention;

FIG. 8 is a view illustrating a bracket for a terminal with a camera module according to another embodiment of the present invention;

FIG. 9 is a view illustrating a bracket for a terminal with a camera module according to another embodiment of the present invention;

FIG. 10 is a cross-sectional view illustrating a stabilizer of FIG. 9 coupled to the head of a bolt;

FIG. 11 is a view illustrating a mounting part of a bracket for a terminal with a camera module according to another embodiment of the present invention; and FIG. 12 is a cross-sectional view taken along line XII-XII of the mounting part of FIG. 11.

Reference numerals set forth in the Drawings includes reference to the following elements as further discussed below:

| | |
|---|---|
| 100, 200, 300, 400, 500: bracket for terminal with camera module | |
| 110: hanger part | 110a: first surface |
| 110b: second surface | 110c: first band hole |
| 111: central portion | 112: first end portion |
| 113: second end portion | 120, 520: mounting part |
| 121: mounting body | 122: plurality of location adjustment holes |
| 122a: first location adjustment hole | 122b: second location adjustment hole |
| 130: connection part | 130a: second band hole |
| 131: first connector | 132: second connector |
| 133: first pivot | 134: second pivot |
| 140: detachable unit | 141: bolt |
| 142: nut | 143: spherical holder |
| 144: ball connector | 144a: ball member |
| 144b: fixing screw | 145: locking screw |
| 146: fixing grip member | 146a: first stopper |
| 147: moving grip member | 147a: second stopper |
| 210: secondary battery | 220: charger terminal |
| 230: communication module | 240: earphone terminal |
| 250: remote control | 331: third connector |
| 332: fourth connector | 333: third pivot |
| 334: fourth pivot | 410: head |
| 420: screw coupling hole | 430: stabilizer |
| 521: cylindrical bar | 522: connection unit |
| 522a: connection bracket | 522b: both-end connection bolt |

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

FIG. 1 is a perspective side view illustrating a bracket for a terminal with a camera module according to an embodiment of the present invention, and FIG. 2 is a perspective front view illustrating a bracket for a terminal with a camera module according to an embodiment of the present invention.

FIG. 3 is a perspective view illustrating a bracket for a terminal with a camera module placed on the floor according to an embodiment of the present invention, and FIG. 4 is a perspective view illustrating a folded bracket for a terminal with a camera module according to an embodiment of the present invention.

FIG. 5 is a magnified view of a portion "A" in FIG. 3, and FIG. 6 is a view illustrating a bracket for a terminal with a camera module worn on the body of a user according to an embodiment of the present invention.

As shown in FIGS. 1 to 6, a bracket 100 for a terminal according to an embodiment of the present invention may include a hanger part 110, a mounting part 120, and a connection part 130. Hereinafter, components of this embodiment will be described in detail with reference to FIGS. 1 to 6.

As shown in FIGS. 1 and 6, the hanger part 110 may have a bent shape so as to be hung around the neck of a user. Accordingly, since the bracket 100 for the terminal can be hung around the neck by the hanger part 110, both hands of a user may become free.

Specifically, the hanger part 110, as shown in FIGS. 1 to 3 and 6, may include a central portion 111 and first and second end portions 112 and 113. The central portion 111 may have a curved shape so as to surround the rear portion of the neck of a user. The first and second end portions 112 and 113 may extend from the central portion 111 in both directions, surrounding the shoulder and the chest of a user. Accordingly, the bracket 100 for the terminal may be hung around the neck of a user by the central portion 111, and may be supported by the shoulder and the chest of a user by the first and second end portions 112 and 113. Particularly, since the hanger part 110 has a curved shape so as to surround or adhere closely to the body, the contact area with the body of a user may be maximized. Thus, the hanger part 110 may be integrated with the body, ensuring stable and convenient activities of a user such as cooking.

Furthermore, as shown in FIGS. 1 to 3 and 6, the first end portion 112, the central portion 111, and the second end portion 113 may be sequentially extended, and may be formed of one plate member having first and second surfaces 110a and 110b. Particularly, when the first surface 110a of the central portion 111 is disposed on the neck of a user, the first end portion 112 may have a twisted shape with respect to the central portion 111 such that the first surface 110a of the first end portion 112 is disposed toward the shoulder and chest at one side of a user, and the second end portion 113 may have a twisted shape with respect to the central portion 111 such that the first surface 110a of the second end portion 113 is disposed toward the shoulder and chest at the other side of a user. Accordingly, the hanger part 110 may smoothly surround the neck of a user like a collar by the twisted shape while being formed of a plate member, enabling more stable and convenient wearing on the body of a user.

Thus, as shown in FIG. 6, the central portion 111 may be hung on the rear portion of the neck of a user, and the first and second end portions 112 and 113 may be supported on the shoulder and chest of a user.

In addition, the hanger part 110 may have at least one first band hole 110c formed in a longitudinal direction thereof. The first band hole 110c may reinforce the torsional strength or the bending strength to prevent the hanger part 110 from being twisted or bent when being in use or storage.

Furthermore, although not shown, a cushion member (not shown) making contact with the body of a user may be disposed in the first band hole 110c. Accordingly, a force applied to the body of a user when the hanger part 110 contacts the body may be dispersed, allowing the hanger part 100 to be more smoothly and comfortably worn on the body of a user.

The mounting part 120, onto which a terminal 10 is mounted, may include a mounting body 121 and at least one location adjustment hole 122 as shown in FIGS. 1 to 6.

The mounting body 121 onto which the terminal is mounted may be disposed at the center of the connection part 130 while having a long shape. The at least one location adjustment hole 122 may penetrate the mounting body 121, and may be formed in a longitudinal direction of the mounting body 121. Accordingly, the location of the terminal 10 may be adjusted in a longitudinal direction of the mounting body 121 through the at least one location adjustment hole 122

Furthermore, as shown in FIGS. 1 to 4, the mounting body 121 may have a long hexahedral shape. The at least one location adjustment hole 122 may include a first location adjustment hole 122a penetrating the mounting body 121 in a vertical direction and a second location adjustment hole 122b penetrating the mounting body 121 in forward and backward directions. Accordingly, since the first and second location adjustment holes 122a and 122b can be selected to mount the terminal 10, the degree of freedom on the location of the terminal 10 can be improved.

As shown in FIGS. 1 to 3, the connection part 130 may be a component connecting the hanger part 110 and the mounting part 120. For example, as shown in FIGS. 1 to 30, the connection part 130 may include a first connector 131, a second connector 132, a first pivot 133, and a second pivot 134.

The first connector 131 may connect one end of the mounting part 120 to the first end portion 112, and the second connector 132 may connect the other end of the mounting part 120 to the second end portion 113. The first pivot 133 may pivotably connect the first connector 131 and the first end portion 112, and the second pivot 134 may pivotably connect the second connector 132 and the second end portion 113. Accordingly, since the mounting part 120 onto which the terminal is mounted can be spaced from the hanger part 110 by a predetermined distance through the first and second connectors 131 and 132, as shown in FIG. 6, an interference between the terminal 10 and the body of a user can be prevented, and the degree of freedom on the location of the terminal can be improved through the first and second pivots 133 and 134. Particularly, as shown in FIG. 3, the bracket 100 can also be used while being placed on the floor.

Particularly, the connection part 130 may form a looped-curve shape together with the hanger part 110 and the mounting part 120. Accordingly, even when an external shock is applied or a user takes violent exercise, the bracket 100 can be prevented from being separated from the body of a user due to such looped curve shape.

Furthermore, the first and second connectors 131 and 132 may also be formed of a plate member. In this case, the first and second connectors 131 and 132 may be bent in a width direction thereof such that the interval between the first connector 131 and the second connector 132 is gradually narrowed from the first and second end portions 112 and 113 to the mounting part 120. Accordingly, as shown in FIG. 4, when the first and second connectors 131 and 132 are folded toward the first and second end portions 112 and 113 using the first and second pivots 133 and 134, the first and second connectors 131 and 132 may be flatly folded at a sufficient angle.

Also, the first and second connectors 131 and 132 may have at least one second band holes 130a formed in a longitudinal direction thereof. The second band hole 130a may reinforce the torsional strength or the bending strength to prevent the first and second connectors 131 and 132 from being twisted or bent when being in use or storage.

Also, the hanger part 110 and the connection part 130 may include a frame formed of a metal plate and a cover formed of flexible polymer or leather. The flexible polymer may be formed of rubber or silicone.

In addition, the bracket 100 for the terminal with the camera module, as shown in FIGS. 1 to 5, may further include a detachable unit 140 for detachably mounting the terminal 10 in the mounting part 120.

As shown in FIGS. 1 and 5, the detachable unit 140 may include a bolt 141 inserted into the location adjustment hole 122, and a nut 142 coupled to the bolt 141. In this case, the terminal 10 may be disposed on the bolt 141 or the nut 142. For example, as shown in FIGS. 1 and 5, the terminal 10 may be disposed on the nut 142.

As shown in FIGS. 2 to 5, the detachable unit 140 may further include a spherical holder 143, a ball connector 144, and a locking screw 145. The spherical holder 143 may be disposed in the nut 142, and not shown in the drawing, may also be disposed on the bolt 141. The ball connector 144 may include a ball member 144a disposed in the spherical holder 143 and a fixing screw 144b protruding from one side of the ball member 144a. The locking screw 145 may be disposed on the spherical holder 143, and may stop or allow the movement of the ball member 144a in accordance with the fastening thereof. In this case, the terminal 10 may be screw-coupled to the fixing screw 144b. Accordingly, the movement of the ball member 144a of the ball connector 144 held in the spherical holder 143 may be stopped or allowed by fastening or unfastening the locking screw 145. Thus, the degree of freedom on the location of the terminal 10 can be improved.

In addition, the detachable unit 140, as shown in FIGS. 2 and 3, may further include a fixing grip member 146 and a moving grip member 147. The fixing grip member 146 may be coupled to the fixing screw 144b, and may have a guide groove (not shown) formed therein, and may have a first stopper 146a. The moving grip member 147 may be slidably disposed in the guide groove of the fixing grip member 146, and may be elastically coupled to the fixing grip member by an elastic body (not shown). Also, the moving grip member 147 may have a second stopper 147a. In this case, the terminal 10 may be located between the first and second stoppers 146a and 147a, and may be gripped by a restoring force of the elastic body. Also, the moving grip member 147 may be screw-coupled to the fixing grip member 146.

Hereinafter, a bracket 200 for a terminal with a camera module according to another embodiment of the present invention will be described in detail with reference to FIG. 7.

FIG. 7 is a view illustrating a bracket for a terminal with a camera module according to another embodiment of the present invention.

As shown in FIG. 7, since the bracket 200 for the terminal with the camera module is similar to the bracket 100 according to the previous embodiment except electronic components 210, 220, 230, 240 and 250, a detailed description thereof will be focused on those electronic components 210, 220, 230, 240 and 250.

A secondary battery 210 among the electronic components may have a strip shape, and may be inserted into the connection part 130 and the hanger part 110. A charger terminal 220 may be disposed on the mounting part 120, and may be electrically connected to the secondary battery 210. Accordingly, the terminal 10 may be charged by the charger terminal 220 and the secondary battery 210.

Also, a communication module 230 of the electronic components may be inserted into the hanger part 110 or the connection part 130 so as to communicate with an external device (not shown), and an earphone terminal 240 may be disposed in the hanger part 110 or the connection part 130, and may electrically connect the communication module 130 and an external earphone (not shown). Here, the communication module 230 may include Bluetooth. Accordingly, during activities such as cooking or exercise, a user can listen to voice information or music from external devices connected to the communication module 230.

Also, a remote control 250 of the electronic components may be disposed in the hanger part 110 or the connection part 130, and may be electrically connected to the communication module 230 to control external devices.

Hereinafter, a bracket 300 for a terminal with a camera module according to another embodiment of the present invention will be described in detail with reference to FIG. 8.

FIG. 8 is a view illustrating a bracket for a terminal with a camera module according to another embodiment of the present invention.

As shown in FIG. 8, since the bracket 300 for the terminal with the camera module is similar to the bracket 100 according to the previous embodiment except a third connector 331, a fourth connector 332, a third pivot 333, and a fourth pivot 334, a detailed description thereof will be focused on the third connector 331, the fourth connector 332, the third pivot 333, and the fourth pivot 334.

The third connector 331 may connect the first connector 131 to one end of the mounting part 120, and the fourth connector 332 may connect the second connector 132 to the other end of the mounting part 120. The third pivot 333 may pivotably connect the first connector 131 and the third connector 331, and the fourth pivot 334 may pivotably connect the second connector 132 and the fourth connector 332.

Accordingly, the degree of freedom on the location of the terminal 10 may be further improved through the third connector 331 and the fourth connector 332, the third pivot 333, and the fourth pivot 334 which are added to the previous embodiment.

Hereinafter, a bracket 400 for a terminal with a camera module according to another embodiment of the present invention will be described in detail with reference to FIGS. 9 and 10.

FIG. 9 is a view illustrating a bracket for a terminal with a camera module according to another embodiment of the present invention, and FIG. 10 is a cross-sectional view illustrating a stabilizer of FIG. 9 coupled to the head of a bolt As shown in FIGS. 9 and 10, since the bracket 400 for the terminal with the camera module is similar to the bracket 100 according to the previous embodiment except a stabilizer 430, a detailed description thereof will be focused on the stabilizer 430.

The stabilizer unit may include a head 41, a screw coupling hole 420, and a stabilizer 430. The head 410 may be a head of the bolt 141 or the nut 142, and the screw coupling hole 420 may be formed in the head 410, and may have a screw thread formed on the inner circumferential surface thereof. The stabilizer 430 may include a coupling bolt 431, a handle 432, and a ball bearing 433 disposed between the coupling bolt 431 and the handle 432, and may be a well-known technology for maintaining the center of gravity of a target object. The coupling bolt 431 may be coupled to the screw coupling hole 420, and then a user may catch the center of gravity of the bracket 400. Thereafter, when a user grips the handle 432 by his/her hand, the stabilizer 430 may serve to maintain the center of gravity of the bracket 400 through the ball bearing 433.

Hereinafter, a bracket 500 for a terminal with a camera module according to another embodiment of the present invention will be described in detail with reference to FIGS. 11 and 12.

FIG. 11 is a view illustrating a mounting part of a bracket for a terminal with a camera module according to another embodiment of the present invention, and FIG. 12 is a cross-sectional view taken along line XII-XII of the mounting part of FIG. 11.

As shown in FIGS. 11 and 12, since the bracket 500 for the terminal with the camera module is similar to the bracket 100 according to the previous embodiment except a mounting part 520, a detailed description thereof will be focused on the mounting part 520.

As shown in FIGS. 11 and 12, the mounting part 520 may include a cylindrical bar 521 and a connection unit 522. The cylindrical bar 521 may have a long cylindrical shape, and may be disposed at the center of the connection part 130. The connection unit 522 may connect the cylindrical bar 521 and the terminal 10.

For example, the connection unit 522, as shown in FIGS. 11 and 12, may include a connection bracket 522a having a U-shape to house the cylindrical bar 521, a both-end fastening bolt 522b penetrating the both end portions of the connection bracket 522a and fastening or unfastening the both end portions of the connection bracket 522a in a face-to-face direction, and a terminal coupling bolt 522c disposed at the outer side of the center of the connection bracket 522a and coupled to the terminal 10.

Accordingly, when a user locates the terminal 10 at a desired place by moving the connection bracket 522 in a horizontal direction along the longitudinal direction of the cylindrical bar 521, the terminal 10 may be fixed to the corresponding location by fastening the both-end fastening bolt 522b.

Meanwhile, as shown in FIG. 1, a cut portion (not shown) may be formed between the central portion 111 of the hanger part 110 and the second end portion 113 (or first end portion) of the hanger part 110. In this case, when the second end portion 113 (or first end portion) pivots on the second pivot 134 (or first pivot) to be separated from the central portion 111, the neck of a user may be inserted into the bracket 100 by moving the bracket 100 from the side of the neck to the neck of a user.

As described above, brackets 100, 200, 300, 400 and 500 for a terminal with a camera module according to embodiments of the present invention have the following effect.

Since the hanger part 110, the mounting part 120 or 520, and the connection part 130 are provided, a user can photograph situations such as exercise or cooking while using both hands.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A bracket for a terminal with a camera module, comprising:
    a hanger part having,
        a bent shape so as to be hung around a user's neck,
        a central portion having a curved shape so as to cover a rear portion of the user's neck, and
        first and second end portions extending from both ends of the central portion, respectively, and having a curved shape so as to cover a user's shoulder and chest, wherein,
        the first end portion, the central portion, and the second end portion sequentially extend and are formed of a plate member having a first surface and a second surface,
        the first surface of the central portion is placed toward the user's neck,
        the first end portion has a twisted shape with respect to the central portion such that the first surface of the first end portion is disposed toward one side of the user's shoulder and chest,
        the second end portion has a twisted shape with respect to the central portion such that the first surface of the second end portion is disposed toward the other side of the user's shoulder and chest, and
        the central portion is hung on a rear portion of the user's neck, and the first and second end portions are supported by the user's shoulder and chest;
    a mounting part onto which the terminal is mounted; and
    a connection part connecting the hanger part and the mounting part, wherein the connection part comprises:
        a first connector connecting one end of the mounting part and the first end portion;
        a second connector connecting the other end of the mounting part and the second end portion;
        a first pivot pivotably connecting the first connector and the first end portion; and
        a second pivot pivotably connecting the second connector and the second end portion.

2. The bracket of claim 1, wherein the hanger part has at least one first band hole formed in a longitudinal direction thereof.

3. The bracket of claim 2, comprising a flexible band disposed in the first band hole.

4. The bracket of claim 1, wherein the hanger part, the connection part, and the mounting part are connected to each other, forming a looped curve shape.

5. The bracket of claim 1, wherein the first and second connectors are formed of a plate member, and are bent in a width direction thereof such that an interval between the first connector and the second connector is gradually narrowed from the first and second end portions to the mounting part.

6. The bracket of claim 1, wherein the first and second connectors have at least one second band hole formed in a longitudinal direction thereof.

7. The bracket of claim 1, wherein the mounting part comprises:
    a mounting body disposed at a center of the connection part and having a long shape onto which the terminal is mounted; and
    at least one location adjustment hole penetrating the mounting body in a longitudinal direction thereof and adjusting the location of the terminal in a longitudinal direction thereof.

8. The bracket of claim 7, wherein the mounting body has a long hexahedral shape, and the at least one location adjustment hole comprises:
    a first location adjustment hole penetrating the mounting body in a vertical direction; and
    a second location adjustment hole penetrating the mounting body in forward and backward directions.

9. The bracket of claim 7, further comprising a detachable unit that allows the terminal to be detachably mounted onto the mounting part.

10. The bracket of claim 9, wherein the detachable unit comprises:
a bolt inserted into the location adjustment hole; and
a nut coupled to the bolt, and
the terminal is disposed on the bolt or the nut.

11. The bracket of claim 10, wherein the detachable unit further comprises:
a spherical holder disposed on the bolt or the nut;
a ball connector comprising a ball member disposed in the spherical holder and a fixing screw protruding from one side of the ball member; and
a locking screw disposed on the spherical holder and stopping or allowing the movement of the ball member, and
the terminal is screw-coupled to the fixing screw.

12. The bracket of claim 11, wherein the detachable unit further comprises:
a fixing grip member coupled to the fixing screw, having a guide groove formed therein, and comprising a first stopper; and
a moving grip member slidably disposed in the guide groove, elastically coupled or screw-coupled to the fixing grip member by an elastic body, and having a second stopper, and
the terminal is located between the first and second stoppers and is gripped by a restoring force of the elastic body.

13. The bracket of claim 10, further comprising:
a head disposed on the bolt or the nut;
a screw coupling hole formed in the head and having a screw thread formed on the inner circumferential surface thereof; and
a stabilizer coupled to the screw coupling hole and maintaining the center of gravity of the bracket when a user grips the bracket after balancing the center of gravity of the bracket.

14. The bracket of claim 1, wherein the connection part further comprises:
a third connector connecting between the first connector and one end of the mounting part;
a fourth connector connecting between the second connector and the other end of the mounting part;
a third pivot pivotably connecting the first connector and the third connector; and
a fourth pivot pivotably connecting the second connector and the fourth connector.

15. The bracket of claim 1, further comprising:
a secondary battery having a strip shape and inserted into the connection part or the hanger part; and
a charger terminal disposed in the mounting part and electrically connected to the secondary battery.

16. The bracket of claim 1, further comprising:
a communication module inserted into the hanger part or the connection part and communicating with an external device; and
an earphone terminal disposed in the hanger part or the connection part and electrically connecting the communication and an external earphone.

17. The bracket of claim 1, further comprising:
a communication module inserted into the hanger part or the connection part and communicating with an external device; and
a remote control disposed in the hanger part or the connection part and electrically connected to the communication module to control the external device.

18. The bracket of claim 1, wherein the hanger part and the connection part comprise a metal plate and a flexible polymer or leather covering the metal plate.

19. The bracket of claim 1, wherein the mounting part comprises:
a cylindrical bar disposed at the center of the connection part and having a long cylindrical shape; and
a connection unit connecting the cylindrical bar and the terminal, and
the connection unit comprises:
a connection bracket having a U-shape to house the cylindrical bar;
a both-end fastening bolt penetrating both end portions of the connection bracket and fastening or unfastening the both end portions of the bracket in a face-to-face direction; and
a terminal coupling bolt disposed at an outer side of the center of the connection bracket and coupled to the terminal.

* * * * *